(12) United States Patent
Carew

(10) Patent No.: US 11,236,734 B1
(45) Date of Patent: Feb. 1, 2022

(54) ANGULAR MOMENTUM ENGINE 2

(71) Applicant: Michael Joseph Carew, Franklin, NJ (US)

(72) Inventor: Michael Joseph Carew, Franklin, NJ (US)

(*) Notice: Subject to any disclaimer, the term of this patent is extended or adjusted under 35 U.S.C. 154(b) by 0 days.

(21) Appl. No.: 17/300,601

(22) Filed: Aug. 31, 2021

(51) Int. Cl.
*F16H 1/46* (2006.01)
*F03G 3/00* (2006.01)

(52) U.S. Cl.
CPC .................. *F03G 3/00* (2013.01); *F16H 1/46* (2013.01)

(58) Field of Classification Search
CPC ..................................... F16H 1/46; F03G 3/00
See application file for complete search history.

(56) References Cited

U.S. PATENT DOCUMENTS

| | | | | |
|---|---|---|---|---|
| 4,811,617 A * | 3/1989 | Whiteman, Jr. | ........ | F16H 19/04 192/21 |
| 2004/0103729 A1 * | 6/2004 | Strickler | ................ | B64G 1/409 74/84 S |
| 2010/0186527 A1 * | 7/2010 | Silver | ...................... | F03H 99/00 74/64 |
| 2016/0363112 A1 * | 12/2016 | Plews | ........................ | F03G 3/00 |
| 2020/0347830 A1 * | 11/2020 | Carew | .................... | B64G 1/409 |

* cited by examiner

*Primary Examiner* — David M Fenstermacher

(57) ABSTRACT

This Angular Momentum Engine 2 in this patent application uses three simple systems: angular momentum, centripetal force, and relative motion to convert a rotational centripetal force to a linear centripetal force. This Angular Momentum Engine 2 is an 'add-on' to any existing vehicles propulsion system. Centripetal force cannot accelerate a vehicle as once this centripetal force reaches a vehicles 'net force resistance', the resistance of a physical object to any change in velocity, the centripetal force becomes tangential. This Angular Momentum Engine centripetal force can only equal a vehicles' 'net force resistance', therefore acceleration is left to the exiting propulsion system, such as a series or parallel automotive hybrid systems, or electric vehicles as examples. Centripetal forces are exponential, as its force is proportional to the square of the speed, while acceleration forces are linear giving this patent design an exponential edge over existing propulsion systems.

12 Claims, 18 Drawing Sheets

TOP VIEW

BOTTOM VIEW

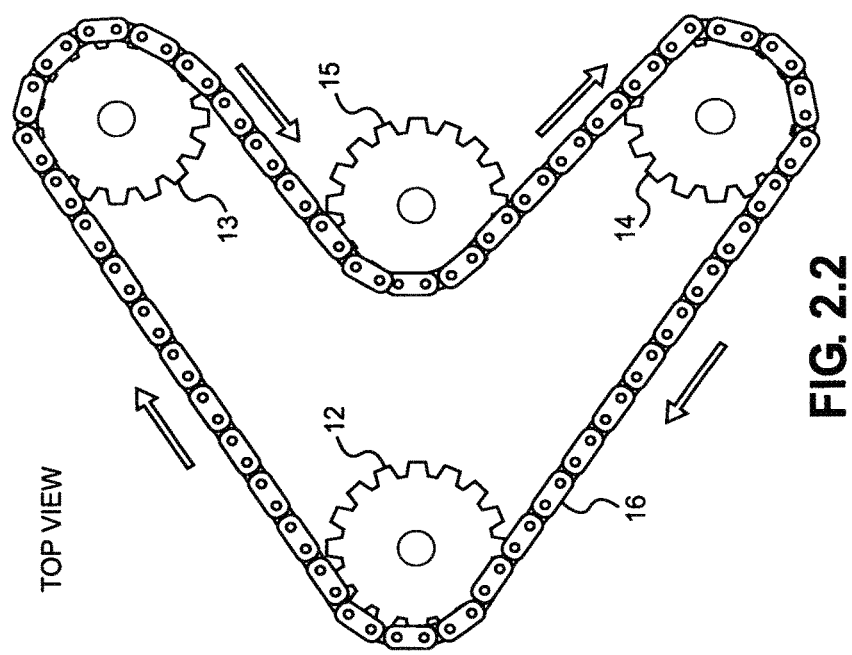
FIG. 2.2

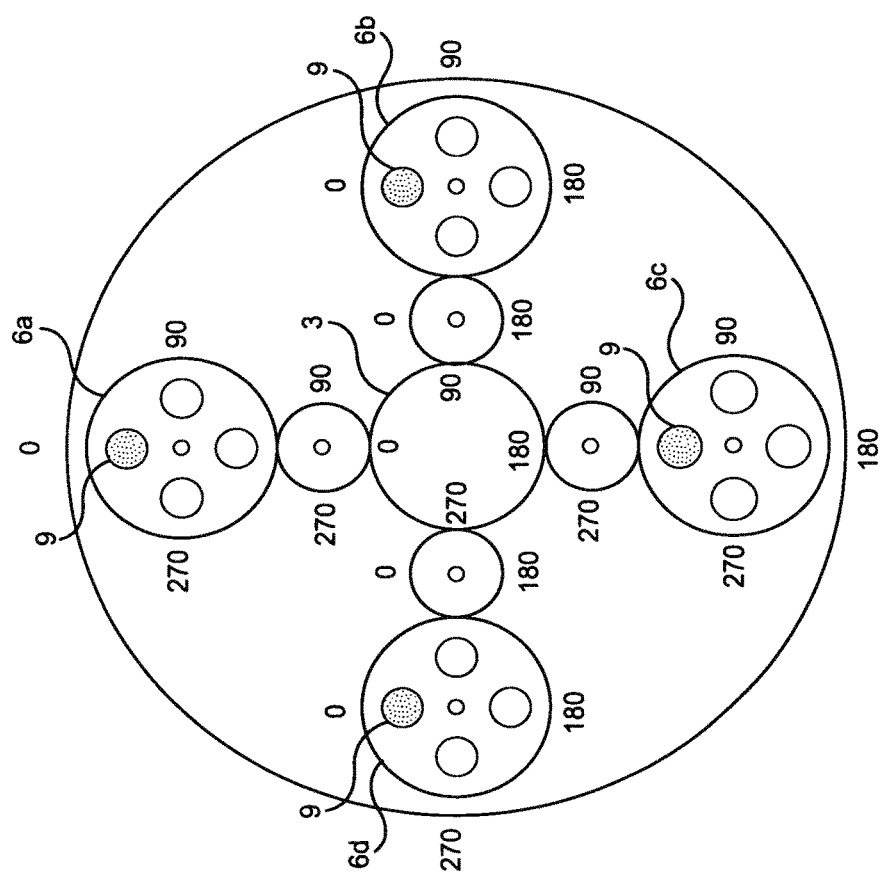

FRONT VIEW

FIG. 10-1     Tungsten weight (6a, 6b, 6c, 6d)

5/20/2020

CENTRIPETAL FORCE   + 616 FT/LBS

Centripetal force work sheet:

Tungsten weight is 1.25 inches from the planet gear axis
+154 ft/lbs. each tungsten weight on planet gears 6a, 6b, 6c, 6d = +616 ft/lbs FIG 9a    FIG 9b
6a. Tungsten weight planet gear-1
6b. Tungsten weight planet gear-2
6c. Tungsten weight planet gear-3
6d. Tungsten weight planet gear-4

| | |
|---|---|
| weight (lbs.) | 1.094 |
| mass (kg.) | 0.496 |
| carbon steel | |
| tensil strength | 40,000 psi |
| round bar | 1 x 2 inches |

| | | |
|---|---|---|
| rotational rate | 2000/60 | f = 33.3 |
| rotational rate | 2 nf | w = 209 |
| mass (kg.) | | m = .496 |
| radius | 1.25 | r = .0318 meters |
| moment of inertia | I = mr2 | I = .0005 kg m2 |
| angular momentum | L =Iw | L = .1045 | centripetal force     F = mrw2   .496 * .0318 * (209 * 209)
                             F = mrw2   .496 * .0318 * (43681)

F = +688 newtons    =    +154 ft/lbs centripetal force     F = mv2/r   .496 * (2000/60 * (3.14 *2 * .0318) )
                             F = mv2/r   .496 * (6.65 * 6.65 ) / .0318
                             F = 690 / 4.5   = 153 ft/lbs torque needed to reach final rotation rate in 1 second
L= .1045 newton meters x .73756    =   .077 ft/lbs.

rotational kinetic energy    KE = ½ Iw2 = 10.92 joules x .738 =    8 ft/lbs

FIG. 10-2  Tungsten weight (6a)
5/20/2020
CENTRIPETAL FORCE  + 888 FT/LBS.

Centripetal force work sheet
Tungsten weight is 7.25 inches from the sun gear
Tungsten weight planet gears 6a = +888 FT/LBS
FIG 9a   FIG 9b
6a  Tungsten weight planet gear-1

| | |
|---|---|
| weight (lbs.) | 1.094 |
| mass (kg.) | 0.496 |
| carbon steel | |
| tensil strength | 40,000 psi |
| round bar | 1 x 2 inches |
| | |
| rotational rate | 2000/60   f = 33.3 |
| rotational rate | 2 nf       w = 209 |
| mass (kg.) | m = .496 |
| radius | 7.25 r = .184 meters |
| moment of inertia | I = mr2   I = .0167 kg m2 |
| angular momentum | L =Iw   L = 3.509 | centripetal force    F = mrw2  .496 * .184 * (209 * 209)
                     F = mrw2  .496 * .184 * (43681)
                     $F = +3986$ newtons  =  +885 ft/lbs centripetal force    F = mv2/r  .496 * (2000/60 * (3.14 *2 * .184) )
                     F = mv2/r  .496 * (38.51 * 38.51 ) / .184
                     F = 3997 / 4.5  = +888 ft/lbs torque needed to reach final rotation rate in 1 second
L= 1 .517  newton meters x .73756   = 1.118  ft/lbs.

rotational kinetic energy   KE = ½ Iw2 = 364.73 joules x .738 =   269 ft/lbs

FIG. 10-3    Tungsten wight  (6c)

CENTRIPETAL FORCE   - 582 FT/LBS

Tungsten weight planet gears 6c = -582 FT/LBS

Centripetal force work sheet:
Tungsten weight  4.75 inches from the sun gear

FIG 9a    FIG  9b
6c  Tungsten weight planet gear-3

| | |
|---|---|
| weight (lbs.) | 1.094 |
| mass (kg.) | 0.496 |
| carbon steel | |
| tensil strength | 40,000 psi |
| round bar | 1 x 2 inches |

| | | |
|---|---|---|
| rotational rate | 2000/60 | f = 33.3 |
| rotational rate | 2 nf | w = 209 |
| mass (kg.) | | m = .496 |
| radius | 4.75 | r = .121 meters |
| moment of inertia | I = mr2 | I = .00726  kg m2 |
| angular momentum | L =Iw | L = 1.517 | centripetal force    F = mrw2  .496 * .121 * (209 * 209)
                     F = mrw2  .496 * .121 * (43681)
                     F = -2621 newtons   =   -582 ft/lbs centripetal force    F = mv2/r  .496 * (2000/60 * (3.14 *2 * .121) )
                     F = mv2/r  .496 * (25.32 * 25.32 ) / .121
                     F = 2627 / 4.5  = -583 ft/lbs torque needed to reach final rotation rate in 1 second
L= 1 .517  newton meters x .73756   =  1.118  ft/lbs.

rotational kinetic energy    KE = ½ Iw2 = 158.56 joules x .738 =   117 ft/lbs

ANGULAR MOMENTUM ENGINE 2

BACKGROUND

With only a 40 year supply of fossil fuels remaining worldwide, new cleaner sources of alternative energy, such as automotive hybrid and electric vehicles, are on the forefront in development Some automakers, such as MERCEDES BENZ, will no longer make cars with internal combustion engines as they look to their future in electric vehicles, while others such as TESLA MOTORS use the 3 phase interior permanent magnet synchronous reluctance motor in their automobiles, a modified version of the 3 phase induction motor invented by the genius Nichols Tesla.

The alternative energy system in this patent application uses three simple systems: angular momentum, centripetal force, and relative motion to create one of the more powerful alternative engines in the world. The design of this engine can be used across the broad spectrum of transportation including space.

This Angular Momentum Engine 2 applies its linear centripetal force, created by angular momentum, to a vehicles net force resistance the resistance of a physical object to any change in velocity. It includes inertia, gravity. aerodynamic drag, hydrodynamic drag, generator mode drag, and frictional and backward forces.

This Angular Momentum Engine 2 is simply an 'add-on' product to the transportation, aerospace, deep space, and defense industries vehicles' propulsion system.

Centripetal force is defined as "the force that is necessary to keep an object moving in a circular path and is directed inward toward the center of rotation", while centrifugal force is defined as "the apparent force that is felt by an object moving in a curved path that acts outwardly away from the center of rotation." according to Merriam Webster Dictionary.

"The difference between centripetal and centrifugal force has to do with different 'frames of reference' that is different viewpoint from which you measure something, according to Andrew A. Ganse, a research physicist at the University of Washington.

If you are observing a rotating system from the outside, you see a rotating centripetal force acting to contain the rotating body to a circular path. However, if you are part of the rotating system, you experience an apparent centrifugal force pushing you away from the center of the circle, even though what you are actually feeling is the inward centripetal force that is literally keeping you from going off in a tangent." FIG. 6A Live Science https://www.livescience.com/52488-centrifugal-centripetal-forces.html A centripetal force can never accelerate a vehicle as its force becomes tangential when greater than a vehicles net force resistance, its inertia, gravity. aerodynamic drag, hydrodynamic drag, generator mode drag FIG. 7, and frictional and backward forces, that oppose a vehicles change in velocity.

A centripetal force can only bring a vehicle close to the moment of a change in velocity and therefore has to interface with a vehicles propulsion system to accelerate the vehicle.

For every industry, the net force resistance of a vehicle continuously changes in a real time environment, therefore, the industries motion control systems must interface with this Angular Momentum Engine 2 to provide a continuously changing centripetal force.

Each industries motion control system must interface with this Angular Momentum Engine 2' to control its centripetal force based on a static or changing net force resistance and with their vehicles propulsion system, "Centripetal force FIG. 5 can be increased by increasing either the speed of rotation or the mass of the body or by decreasing the radius, which is the distance of the body from the center of the curve. Increasing the mass or decreasing the radius increases the centripetal force in direct or inverse proportion, respectively, but increasing the speed of rotation increases it in proportion to the square of the speed; that is, an increase in speed of 10 times say from 10 to 100 revolutions per minute, increase the centripetal force by a factor of one hundred",   written by the editors of the Encyclopedia Britannica last updated Feb. 13, 2018.

The centripetal force created by angular momentum is only limited by its speed of rotation, mass, and radius and therefore can reach unlimited proportions.

This Angular Momentum Engine 2 patent submission has only a minor informational clarity to the Angular Momentum Engine patented on Jun. 1, 2021. The Angular Momentum Engine 2 counteracts the drag of the generator mode in addition to all other net force resistance allowing the vehicle to maintain a constant velocity, while the generator mode FIG. 7 continuously charges the lithium-ion battery. FIG. 7 illustrates the motor/generator motor mode and generator mode. The informational changes regarding the generator mode are added to paragraphs [0003], [0007], [0014], [0030], [0084], and claims 11c, 12e.

SUMMARY OF INVENTION

This Angular Momentum Engine converts rotating centripetal forces to linear centripetal forces. Two identical side by side single stage planetary gearboxes, rotating synchronously clockwise and counter-clockwise, are used to accomplish this conversion. Each of these two identical gearboxes contain a planet gear carrier, four pinion gears, four planet gears, a held sun gear, and do not have a ring gear.

There is a one to one gear ratio between the held sun and planet gears.

The pinion gears have a two to one gear ratio to the planet and sun gears.

A tungsten weight is press fit into each planet gear at the zero degree timing mark, while corresponding lightening holes are at the ninety, one hundred eighty, and two hundred seventy degree timing marks to reduce spin up time. The tungsten weight and the three lightening holes are all equal distance from their planet gears axes.

For every degree the planet gear carrier is rotated around the held sun gear, the four planet gears turn one degree in the opposite direction on their axis. These two simultaneous rotations result in the same net positive linear centripetal force on the two gearboxes.

Centripetal forces are unable to accelerate a vehicle as once the centripetal forces are greater than a vehicles net force resistance they become tangential.

This Angular Momentum Engine 2 centripetal force counteracts the vehicles net force resistance, (inertia, gravity, aerodynamic drag, hydrodynamic drag, generator mode drag, frictional forces, and backward forces) that oppose a vehicles change in velocity, and in combination with the vehicles propulsion system, are used to accelerated the vehicle.

As a vehicles net force resistance depends on the 'real time' environment in which it operates these conditions will dictate the magnitude of the centripetal forces required under 'real time' conditions.

The industries motion controlled motor, receives continuous feedback from the Angular Momentum Engine 2, so it can counteract the vehicles static or changing net force resistance, while the industries propulsion system accelerate the vehicle.

Centripetal forces are proportional to the square of the speed an therefore have an exponential advance over linear acceleration forces.

BRIEF DESCRIPTION OF THE DRAWINGS

FIG. 2.2—Reversing sprockets

FIG. 2.3—Timing Marks

FIG. 3*a*—101 Planetary gearbox 1—top view (clockwise rotation)

FIG. 3*b*—101 Planetary gearbox 1—top view (clockwise rotation)

FIG. 3*c*—102 Planetary gearbox 2—top view (counterclockwise rotation)

FIG. 3*d*—102 Planetary gearbox 2—top view (counterclockwise rotation)

FIG. 4-1—Pinion Gear—2×2 inch gear

FIG. 4-2—Planet Gear—4×2 inch gear

FIG. 4-3—Sun Gear—4×2 inch gear

FIG. 10-1—Tungsten weight (6*a*. 6*b*, 6*c*, 6*d*)—Centripetal force from planet axis FIG. 10-2—Tungsten weight (6*a*)—Centripetal force from sun gear FIG. 10-3—Tungsten weight (6*c*)—Centripetal force from sun gear

BRIEF DESCRIPTION OF THE INVENTION

This patent application illustrates how to change, from the perspective of different frames of reference, a rotating centripetal force to a linear centripetal force, using the science of relativity to harness one of the most powerful and highly energy efficient source of alternative energy . . . angular momentum.

Figure 1:
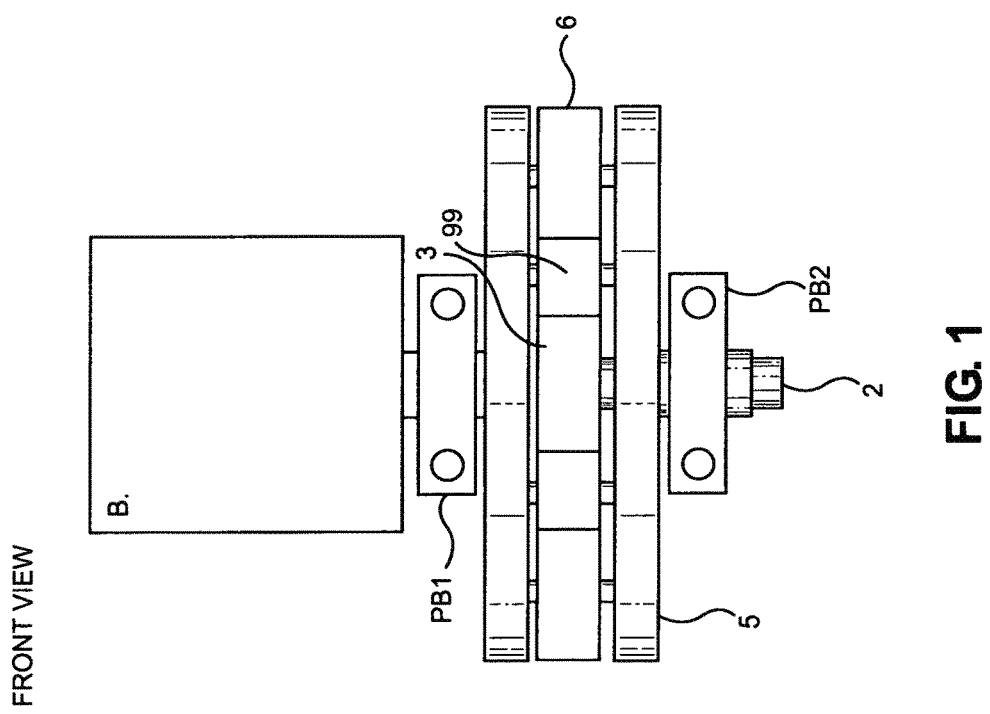
FIG. 1—System design—1 stage planetary gearbox (front view)

FIG. 1 This 'Angular Momentum Engine 2' uses a simple 1 stage planetary gearbox in its design. The 3. 'sun gear' and the 6. 'planet gear's have a 1:1 gear ratio. The 99. 'pinion gear's have a 2:1 gear ratio to the 3. 'sun gear' and the 6. 'planet gear's' The 3. 'sun gear' is held by the 2. 'sun gear shaft'. The gearbox does not have a ring gear. These gears have a double helical design and are orientated horizontally on their vertical axes.

Figure 1A:
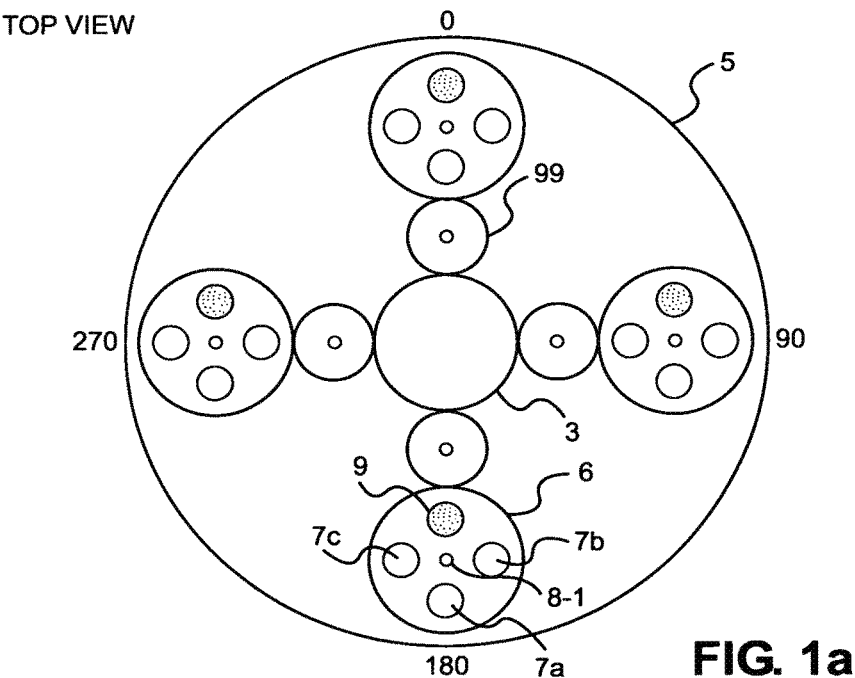
FIG. 1*a*—System design—1 stage planetary gearbox (top view)
Figure 1B:
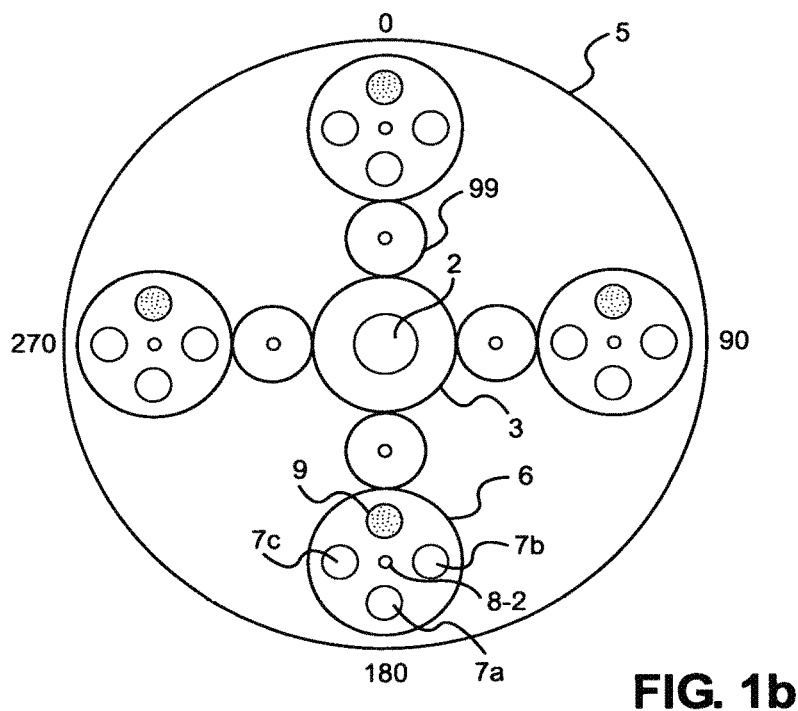
FIG. 1*b*—System design—1 stage planetary gearbox (bottom view)
Figure 2:
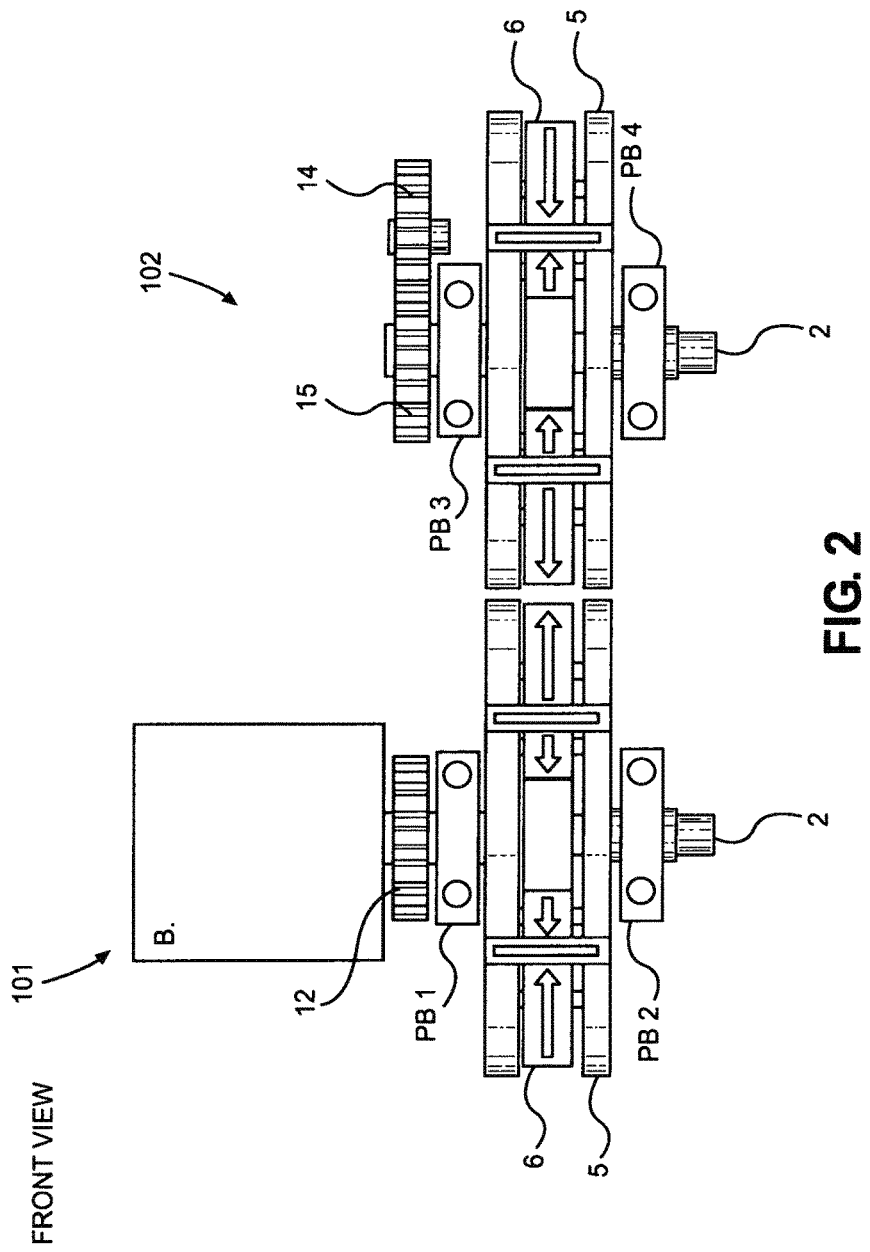
FIG. 2—System design—Angular Momentum Engine 2—(front view)

FIG. 1 FIG. 1*a* FIG. 1*b* This 1 stage planetary gearbox has a 5. 'planet gear carrier', four 99. 'pinion gear's, four 6. 'planet gear's and a one piece 3. 'sun gear' and 2. 'sun gear shaft' design. The 3. 'sun gear' is held by the 2. 'sun gear shaft'. The 5. 'planet gear carrier' has an upper and lower flange. Each of the gears and flanges have a zero, ninety, one hundred eight, and two hundred seventy degree timing marks and are aligned on these timing marks. FIG. 2.3 The gearbox does not have a ring gear.

Figures 1, 4:
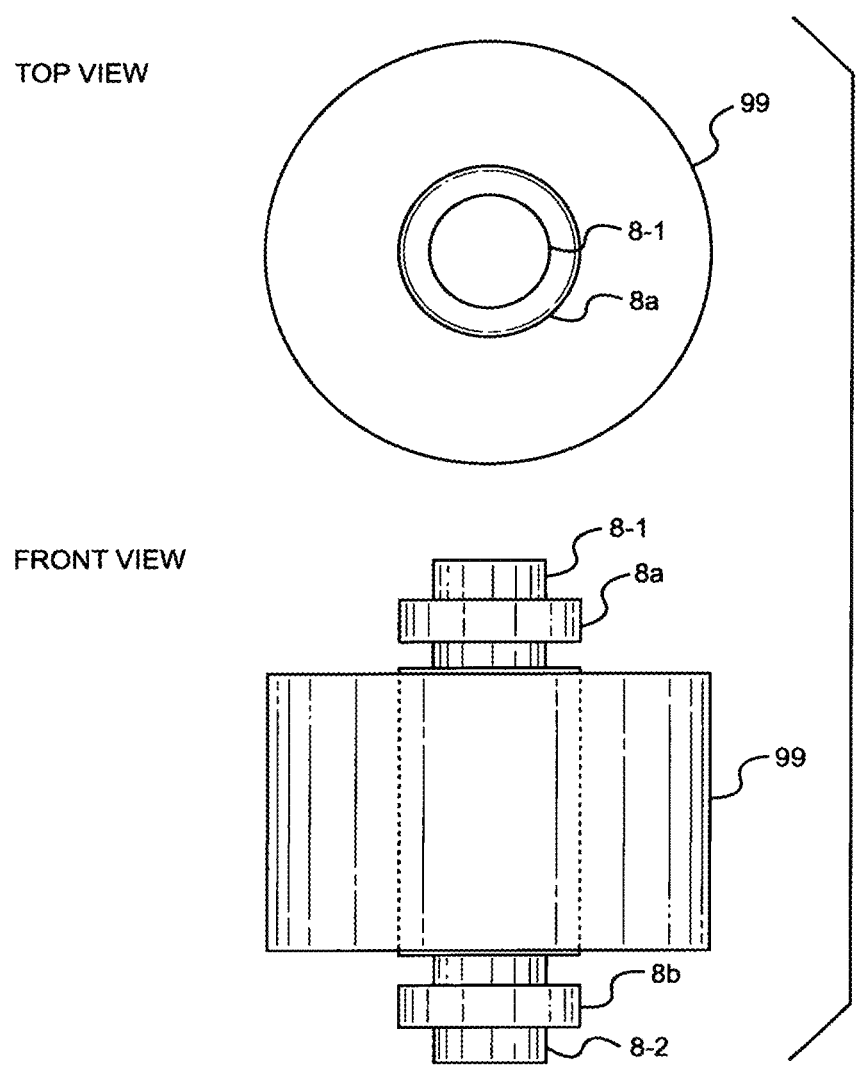
Figures 2, 4:
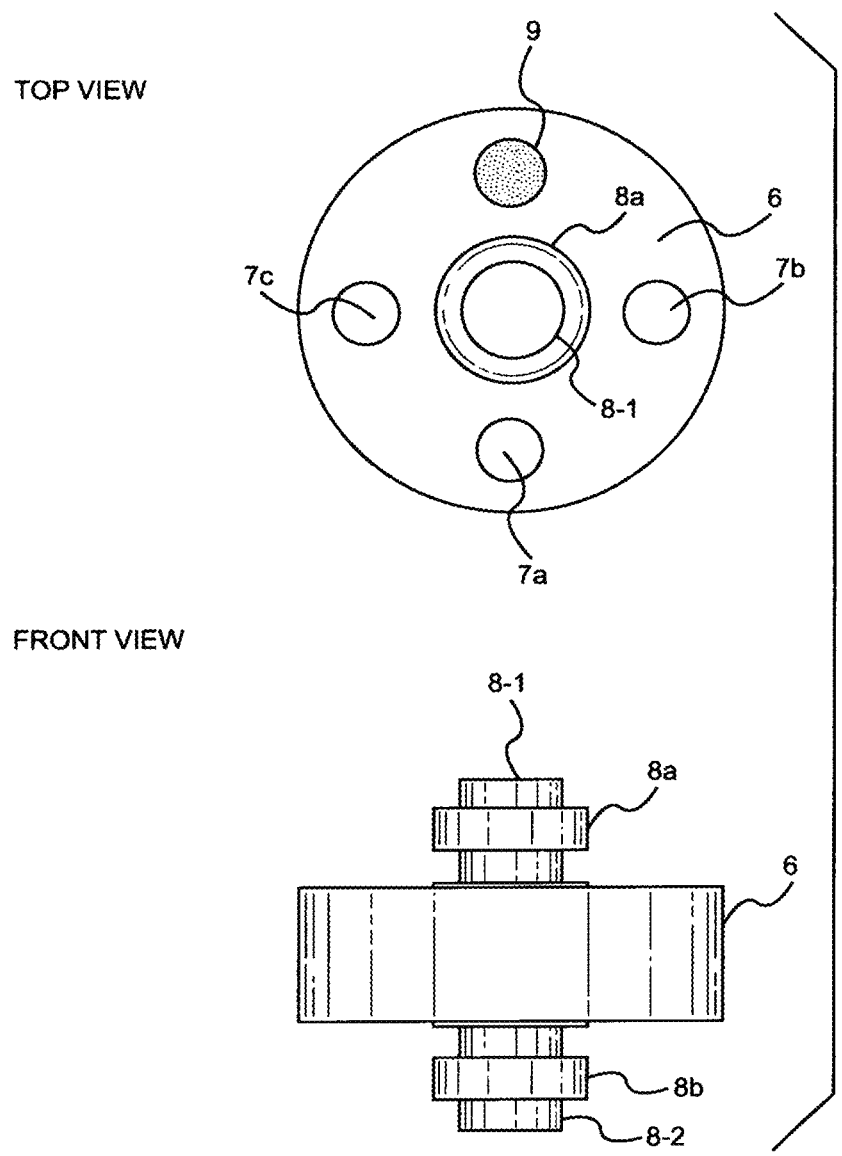

FIG. 4-2 illustrates the 'one piece' four inch diameter by 2 inch face width carbon steel 6. 'planet gear'. Four lightening holes are machined into the carbon steel 6. 'planet gear', creating four 'empty shell's. The one by two inch 7*a*. 'empty shell', 7*b*. 'empty shell', and 7*c*. 'empty shell' reduce the weight of the 6. 'planet gear' to improve 'spin up time'.

FIG. 4-2 The 9. 'tungsten-weight' is a one by two inch tungsten round bar pressed into the empty shell. This tungsten 0.496 kg. (1.094 lb.) 9. 'tungsten-weight' is 2.4 times heavier than carbon steel. The 8-1. 'planet gear axis' uses the 8*a*. 'bearing'. The 8-2. 'planet gear axis' uses the 8*b*. 'bearing'.

FIG. 4-1 illustrates the 'one piece' two inch diameter by 2 inch face width carbon steel 99. 'pinion gear'. The 8-1. 'pinion gear axis' uses the 8*a*. 'bearing'. The 8-2. 'pinion gear axis' uses the 8*b*. 'bearing'.

Figures 3, 4:
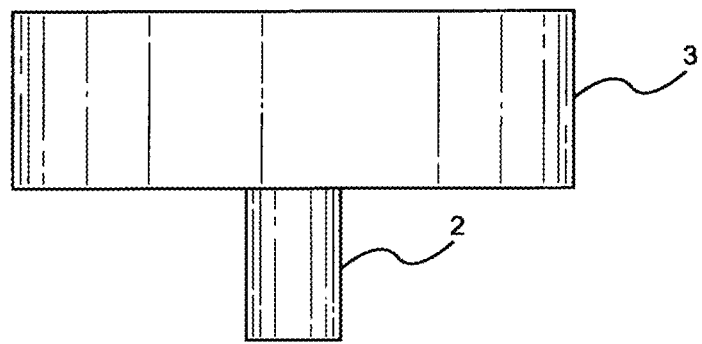
Figure 5:
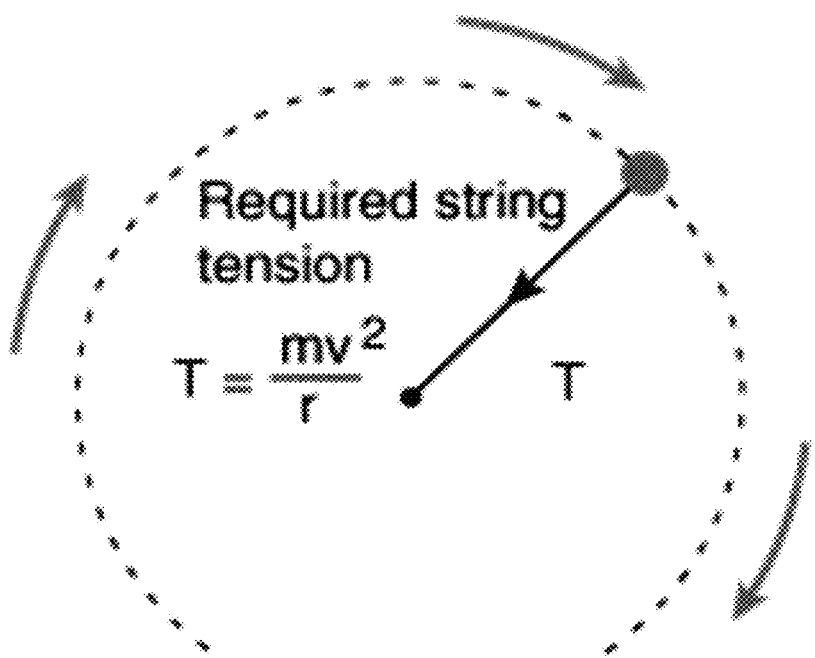
FIG. 5—Centripetal force

FIG. 4-3 illustrates the 'one piece' four inch diameter by 2 inch face width carbon steel 3. 'sun gear'. The 3. 'sun gear' is 'held' by the 2. 'sun gear shaft.

FIG. 1 FIG. 2 FIG. 3*a*, 3*b*, 3*c*, 3*d* The 101. 'Planetary gearbox 1', and 102. 'Planetary gearbox 2' turn clockwise and counter-clockwise, respectively, rotating their 5. 'planet gear carrier' assembly ie. 99. 'pinion gear's and 6. 'planet gear's around the held 3. 'sun gear. As the 6. 'planet gear's are rotated around the held 3. 'sun gear', a centripetal force is created on each 9. 'tungsten-weight' as a result of their angular momentum.

FIG. 1 FIG. 2 FIG. 3*a*, 3*b*, 3*c*, 3*d* The 6. 'planet gear's are simultaneously turned in the opposite direction on their 'axis' as a result of the held 3. 'sun gear' creating a second centripetal force on each 9. 'tungsten-weight' as a result of their angular momentum.

These two sets of 'centripetal forces' are examined in the following detailed description.

DETAILED DESCRIPTION

There is a huge diversity in the design of planetary gearboxes compared to this patent design. In a standard automotive transmission one gear is held, one turned, and one gear used as the output to drive the vehicle. This design enables the vehicle torque to match the vehicle load while the automobile is accelerating to highway speed.

The 'fly by wire' TOYOTA PRIUS 'power split device' is designed to use input from its two permanent magnet motor/generators, MG2 and MG1 as well as its internal combustion engine (ICE) to specifically match torque with load demands in this 60 mile per gallon parallel hybrid system.

The complex ALLISON transmission uses sets of gears, called compound planetary gearsets, that look like a single planetary gearset but actually work like two planetary gearsets combined. It has one ring gear that is always the output of the transmission, but it has two sun gears and two sets of planets.

Each of these transmissions have in common an output drive shaft that is used to turn the vehicle's wheels.

Figure 8:
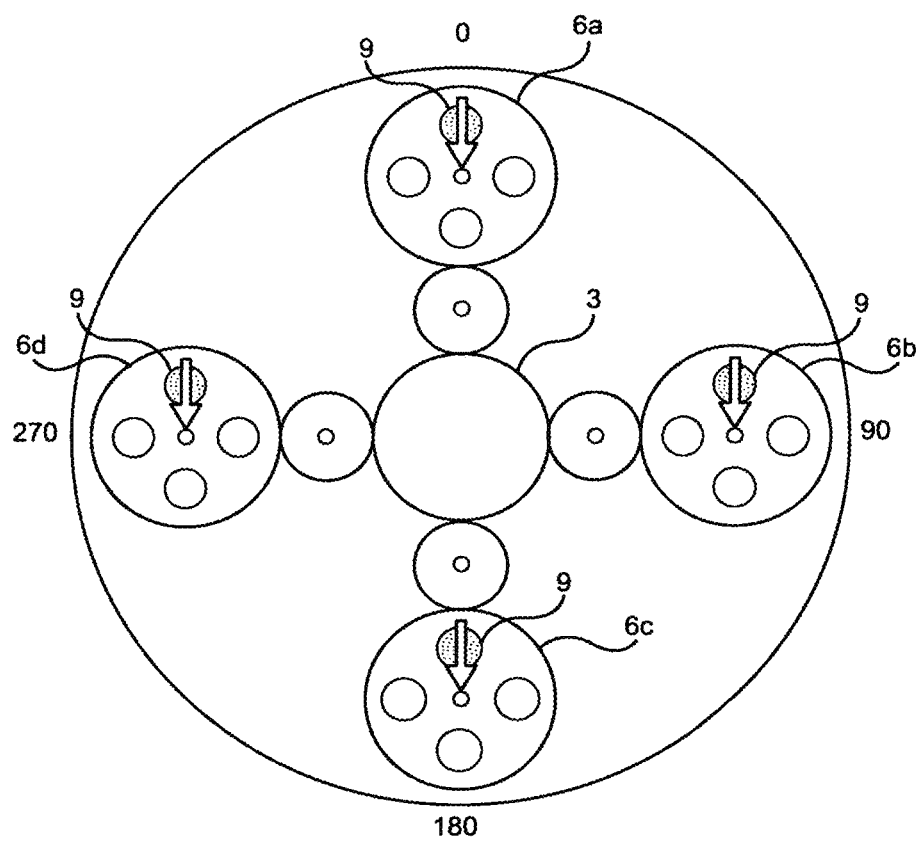
FIG. 8—Patent Design compared to other planetary gearboxes

In this patent design, the relative motion of a tungsten-weight generates a linear centripetal force (see arrows) FIG. 8. that is applied against a vehicles' net force resistance, its resistance to a change in velocity and therefore does not require an output drive shaft. FIG. 8

This Angular Momentum Engine 2 uses two identical 'side by side', vertically orientated 'one stage' planetary gearboxes. FIG. 2

The two identical 'side by side' gearboxes 101. 'Planetary Gearbox 1' and 102. 'Planetary Gearbox 2' rotate in opposite directions to balance the rotational forces. FIG. 2

FIG. 1 FIG. 2 FIG. 3*a* FIG. 3*b* The B. '3 phase induction Motor' rotates the 101. 'Planetary gearbox 1' 45 degrees clockwise around the held 3. 'sun gear'.

FIG. 1 FIG. 2 FIG. 3*a* FIG. 3*b* With the 3. 'sun gear' held, the 99. 'pinion' gear turns 90 degrees clockwise and the 6. 'planet gear' turns 45 degrees counter-clockwise.

In summary. the 5. 'planet gear carrier' has rotated 45 degrees clockwise around the held 3. 'sun gear', while the 99. 'pinion' gear turns 90 degrees clockwise and the 6. 'planet gear' turns 45 degrees counter-clockwise on their axis in 101. 'planetary gearbox 1'.

Figure 3A:
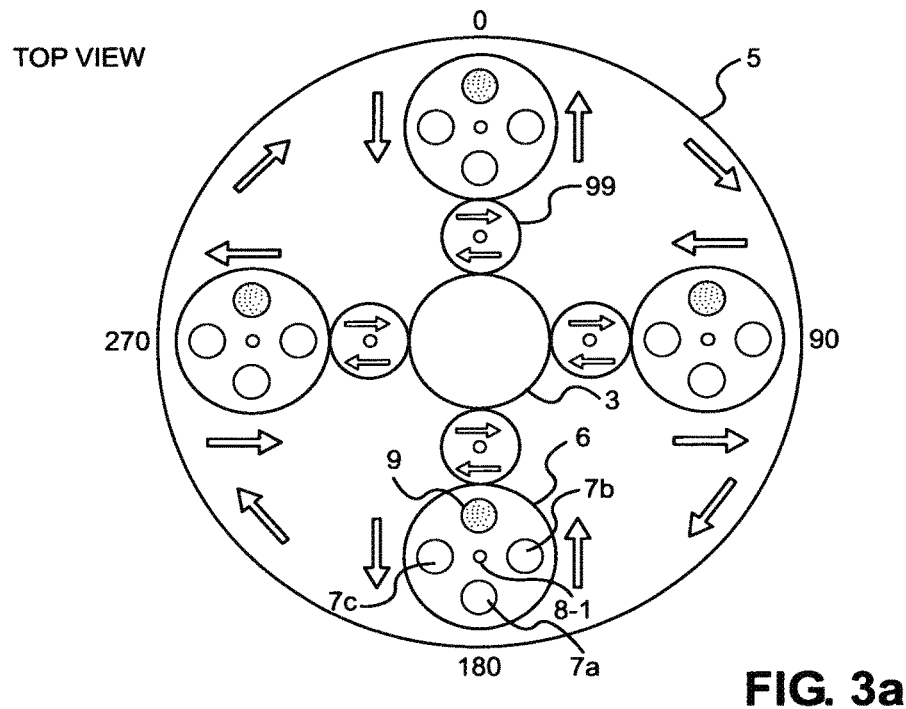
Figure 3B:
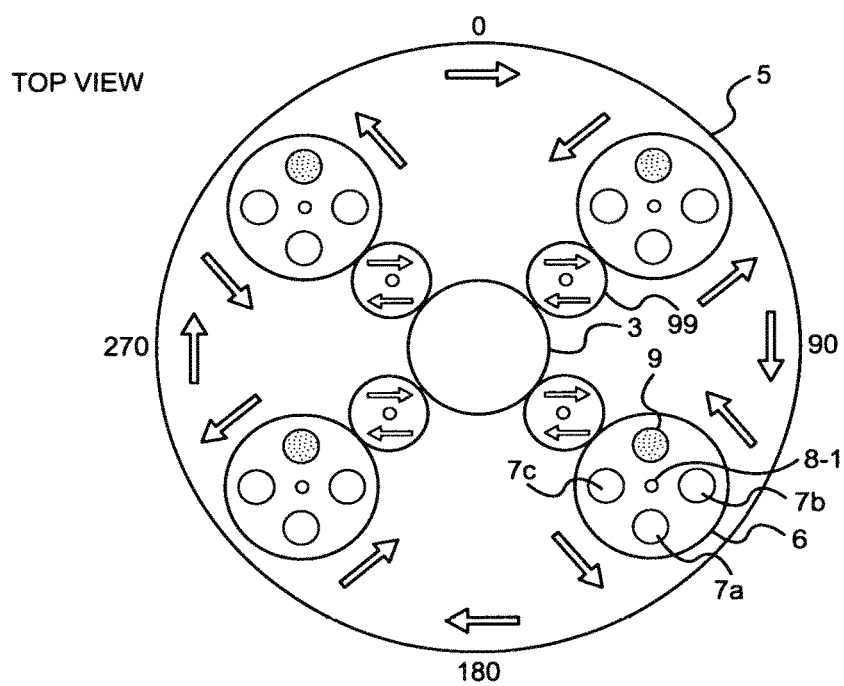
Figure 3C:
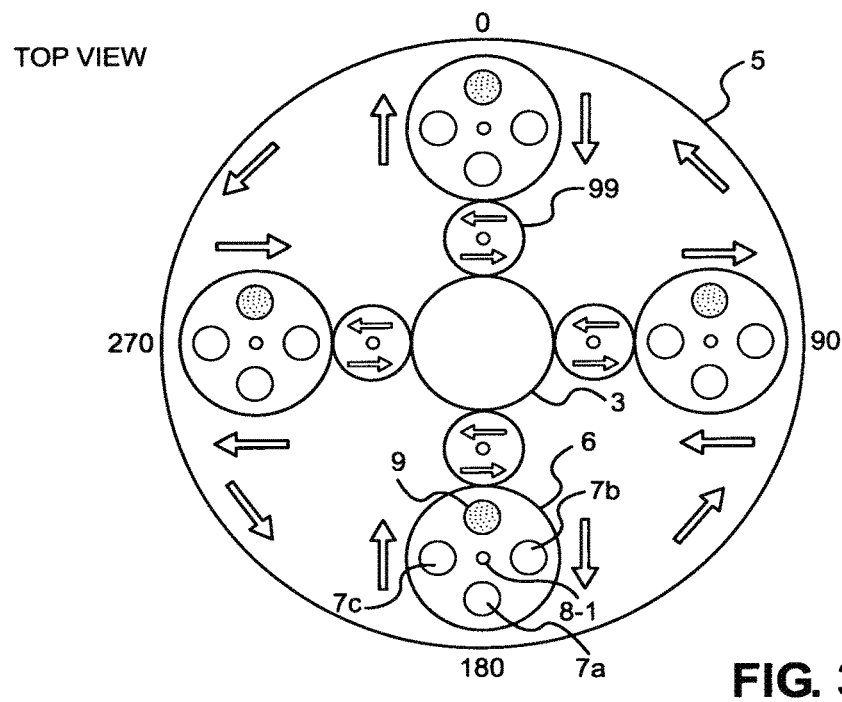
Figure 3D:
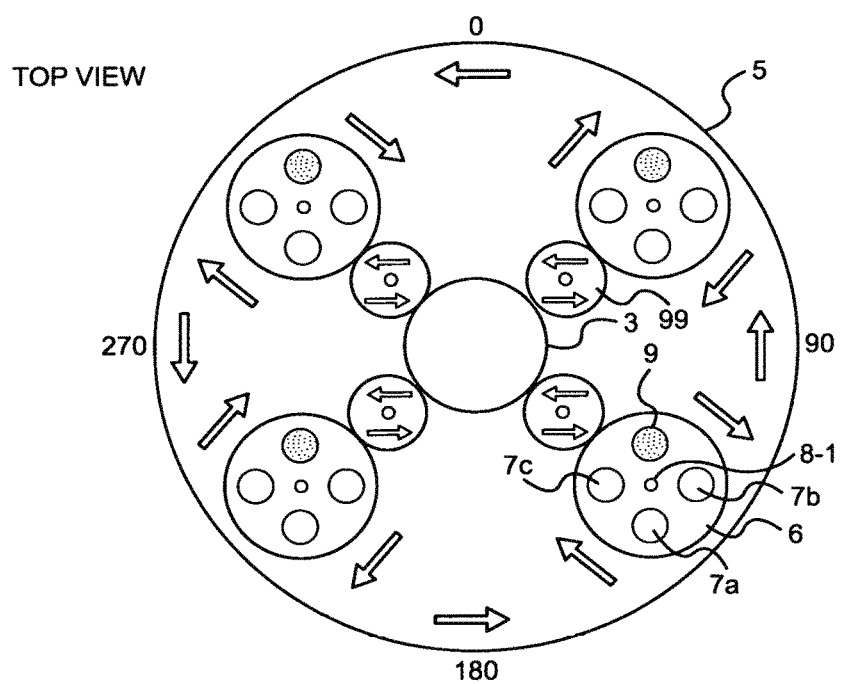

FIG. 2 FIG. 3*c* FIG. 3*d* The 102. 'planetary gearbox 2' turns in the opposite direction of 101. 'planetary gearbox 1' due to 12. 'drive sprocket', 15. 'driven sprocket' the 13. 'idler sprocket' and, 14. 'idler sprocket' and the 16. 'double duplex timing chain' reversing the rotational direction of the input to 102. 'Planetary Gearbox 2. FIG. 2.2

FIG. 2 FIG. 3*c* FIG. 3*d* With the 15. 'driven sprocket' turning 45 degrees counter-clockwise the 5. 'planet gear carrier' assembly rotates 45 degrees counter-clockwise around the held 3. 'sun gear'

FIG. 2 FIG. 3*c* FIG. 3*d* With the 3. 'sun gear' held, the 99. 'pinion' gear turns 90 degrees counter-clockwise and the 6. 'planet gear' turn 45 degrees clockwise on their axis.

In summary. the 5. 'planet gear carrier' has rotated 45 degrees counter-clockwise around the held 3. 'sun gear; while the 99. 'pinion' gear turns 90 degrees counter-clockwise and the 6. 'planet gear' turn 45 degrees clockwise on their axis in 102. 'planetary gearbox 2'.

This 45 degree motion analogy is used to illustrate the movement of the component parts of this Angular Momentum Engine 2 in slow motion.

The linear centripetal force of this Angular Momentum Engine 2 is 922 ft/lbs. at 2000 rpm for each of the two 'side by side' planetary gearboxes, 101. 'planetary gearbox 1' and 102. 'planetary gearbox 2', for a total of 1,844 ft/lbs. of centripetal force for this Angular Momentum Engine 2. FIG. 2

Figure 9A:
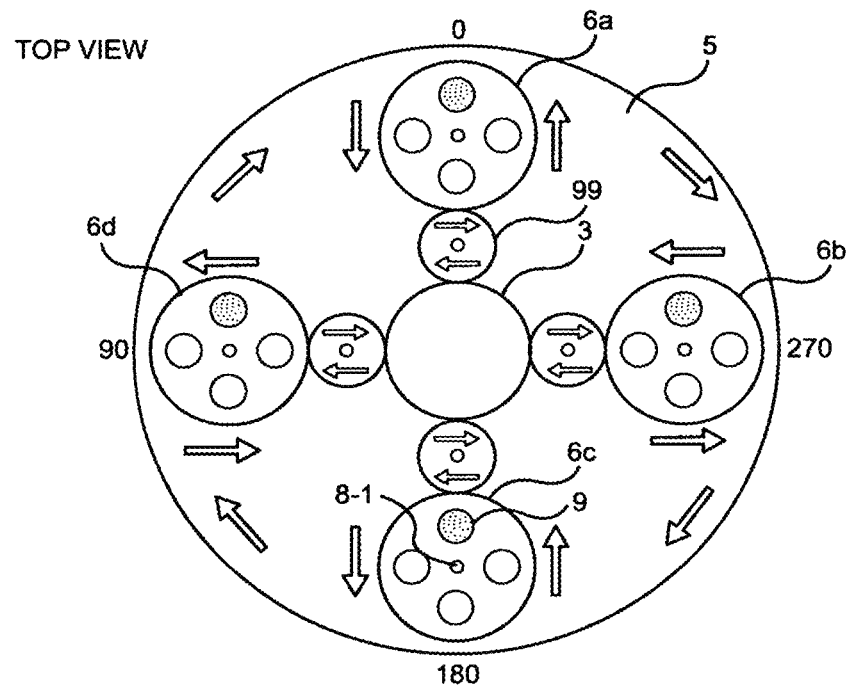
FIG. 9*a*—Planetary gearbox 1—top view (clockwise rotation)

The 922 ft/lbs. of linear centripetal force, for 101. planetary gearbox 1 is the sum of the clockwise rotation of the 'planet gear' (6*a*, 6*b*, 6*c*, 6*d*). by the 5. 'planet gear carrier', and the counter-clockwise turning of the 'planet gear' (6*a*, 6*b*, 6*c*, 6*d*). as a result of the 'held' 3. 'sun gear'. FIG. 9*a*

Figure 9B:
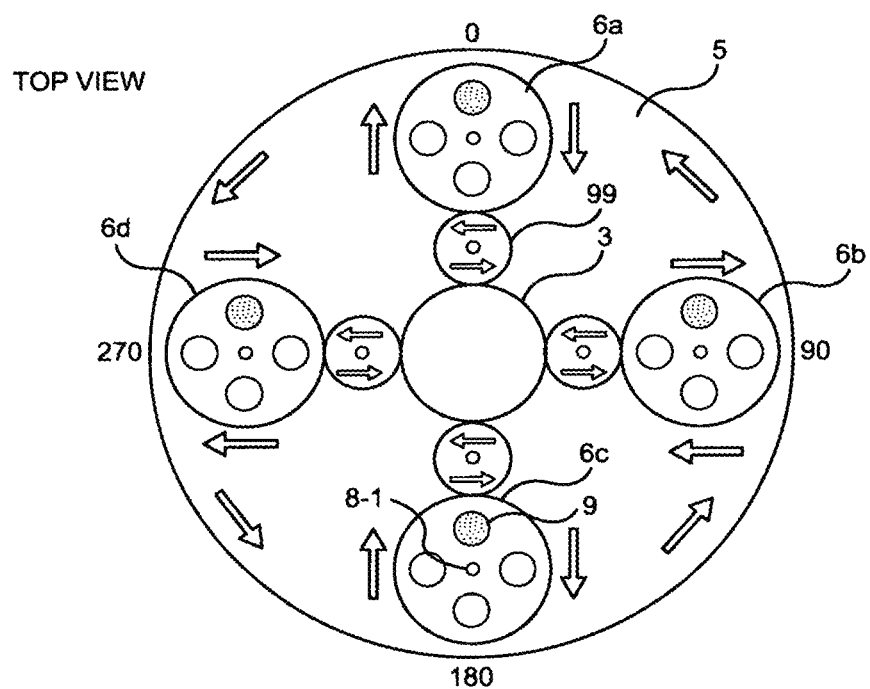
FIG. 9*b*—Planetary gearbox 2—top view (counter-clockwise rotation)

The 922 ft/lbs. of linear centripetal force, for 102. 'planetary gearbox 2' is the sum of the counter-clockwise rotation of the 'planet gear' (6*a*, 6*b*, 6*c*, 6*d*). by the 5. 'planet gear carrier and the clockwise turning of the 'planet gear' (6*a*, 6*b*, 6*c*, 6*d*). as a result of the 'held' 3. 'sun gear'. FIG. 9*b*

In summary, 102. 'Planetary Gearbox 2' runs in the opposite direction of the 101. 'Planetary Gearbox 1' each producing 922 ft/lbs of linear centripetal force at 2000 rpm.

A refined explanation of how this 1,844 ft/lbs of linear centripetal force is created for each of the two planetary gearboxes at 2000 rpm follows.

The 1.094 lb. 'tungsten-weight' (0.496 kg) on 'planet gears' 1 thru 4 (6*a*, 6*b*, 6*c*, 6*d*) in 101. 'planetary gearbox 1' and 102. 'planetary gearbox 2' are 1.25 inches away from its axis', each creating +154 foot-pounds of linear centripetal force as they are turned 2000 rpm. FIG. 10-1 FIG. 9*a* FIG. 9*b*

The 1.094 lb. tungsten-weight (0.496 kg) on 6*a*. 'planet-1' in 101. 'planetary gearbox 1' and 102. 'planetary gearbox 2' are 7.25 inches away from the 3. 'sun gear', creating +888 foot-pounds of linear centripetal force. as it is rotated 2000 rpm. FIG. 10-2 FIG. 9*a* FIG. 9*b*

The 1.094 lb. 'tungsten-weight' (0.49 kg) on 6*e*. 'planet-3' in 101. 'planetary gearbox 1' and 102. 'planetary gearbox 2' are 4.75 inches away from the 3. 'sun gear', creating a negative −582 foot-pounds of linear centripetal force as it is rotated 2000 rpm. FIG. 10-3 FIG. 9*a* FIG. 9*b*

In summary, the sum of these forces [154+154+154+154+888−582] equals +922 foot pounds of linear centripetal force at 2000 rpm for 101. 'planetary gearbox 1' and 102. 'planetary gearbox 2', for a total of 1,844 ft/lbs. of linear centripetal force.

The linear centripetal force for each of the planet gears (6*a*, 6*b*, 6*c*, 6*d*) 'tungsten-weight' change as they rotate around the 3. 'sun gear'. The net sum of these forces, however, remains the same at 922 foot pounds for 101. 'planetary gearbox 1', and 922 foot pounds for 102. 'planetary gearbox 2' as the planet gears rotate around the 3. 'sun gear'. FIG. 9*a* FIG. 9*b*

Figure 6A:
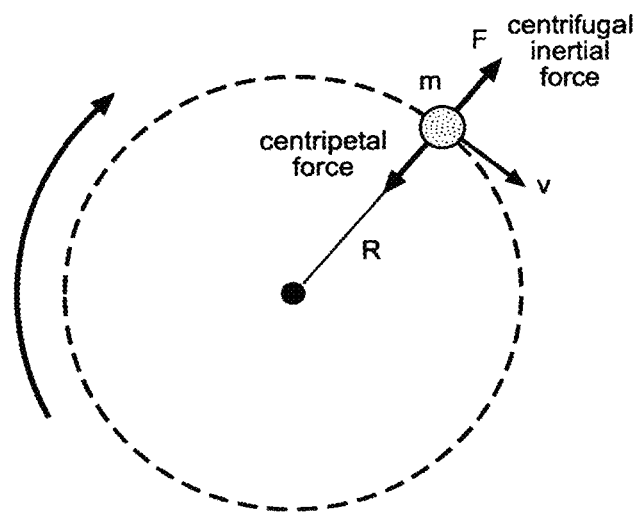
FIG. 6A—Centripetal and Centrifugal force illustration
Figure 6B:
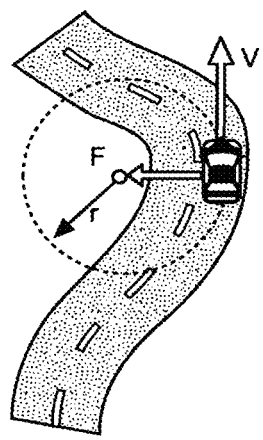
FIG. 6B—Equation for Centripetal force

This 'patent gearbox' is 95 percent efficient. Increasing the speed of rotation increases the centripetal force in proportion to the square of the speed making it one of the most efficient and powerful engines in today's marketplace. FIG. 6B The TESLA electric motor delivers 360 to 470 HP depending on the model. Using this electric motor as input, the 'linear centripetal force' for each of the two gearboxes with a (1.094 lbs.) tungsten-weight are:

| Planetary gearbox 1 | | | Planetary gearbox 2 | | | Total |
|---|---|---|---|---|---|---|
| 230.5 ft/lbs. | @ | 1000 rpm | 230.5 ft/lbs. | @ | 1000 rpm | 461 ft lbs. |
| 922 ft/lbs. | @ | 2000 rpm | 922 ft/lbs. | @ | 2000 rpm | 1,844 ft lbs. |
| 3,688 ft/lbs. | @ | 4000 rpm | 3,688 ft/lbs. | @ | 4000 rpm | 7,376 ft lbs. |
| 14,752 ft/lbs. | @ | 8000 rpm | 14,752 ft/lbs. | @ | 8000 rpm | 29,504 ft/lbs. |
| 59,008 ft/lbs. | @ | 16000 rpm | 59,008 ft/lbs. | @ | 16000 rpm | 118,016' ft lbs. |

Increasing the speed of rotation, from 1,000 to 16,000 rpm increases the linear centripetal force is proportion to the square of the speed, or 16 squared. The linear centripetal force is 256 times greater for this Angular Momentum Engine 2 at 16,000 rpm (118,016 ft/lbs) than at 1000 rpm (461 ft/lbs). Increasing the tungsten weight, by four, from 1.094 to 4.376 pounds would produces 472,064 ft/lbs of centripetal force @ 16,000 rpm.

Although these forces are well beyond the normal automotive power/torque curve it brings into sharp focus the sheer power of this type of engine for use across the broad spectrum of transportation including space.

This Angular Momentum Engine 2 has a 280 mpg highway estimate for a 3,200 pound automobile and is 95 percent efficient, as its linear centripetal force is proportional to the square of the speed. FIG. 2

In comparison. a hybrid automobile with a L-ion battery has a 99 percent charge efficiency and the discharge loss is small, with a 63 mpg estimate. The energy efficiency of a fuel cell is 20 to 60 percent while the internal combustion engine is 25 to 30 percent, giving significantly lower mpg ratings."

It is not the purpose of this patent application to define the type of Motor that would be used as input, nor to define and illustrate the type of hybrid or electric vehicle to incorporate with this patent Angular Momentum Engine 2. Its purpose, however, is to highlight the maximum capability of its design for marketability and utilization.

"Most of the auto manufacturers use synchronous motors, but whether it is a permanent magnet or electromagnet strongly influences the performance. TESLA MOTORS in its new Model-3 uses a permanent magnet electric motor instead of the AC induction motor it has used so far."

"The key difference is that AC induction motors have to use electricity to generate the magnetic currents inside the motor, which cause the rotor to spin, whereas a permanent magnet motor doesn't require that additional current since its magnets are always 'on'. This means that the Model-3's TESLA motor is more efficient and thus better for smaller and lighter cars, but not ideal for high performance cars, since an AC induction motor can produce greater power/"

"The 3 phase A/C induction motor invented by the genius Nicholas Tesla has a simple and rugged construction. This TESLA motor has no permanent magnets, no brushes, no communicator ring, and no position sensors. A variable speed drive controls the 3 phase current input power frequency. It uses highly permeable thin slices of steel laminations inside a steel or cast iron frame minimizing eddy currents". The TESLA roadster electric motor offers 758 lb/ft of torque nearly 1000 hp.

"The maximum torque of an induction motor is at zero rpm. This means that right from the moment the motor starts to rotate a near maximum torque is available". Induction motors are also used in the e-hybrid FORMULA ONE race cars putting a spotlight on the power/torque capabilities of these hybrid technologies.

Parallel hybrid system is defined as having both an internal combustion engine and an electric motor that both individually or jointly couple up to drive the car. In a series hybrid, the electric motor is the only means of providing power to the wheels. The motor receives electric power from either the battery pack or from a generator run by a gasoline engine". In an all electric vehicle the battery is charged at a charging station.

Figure 7:
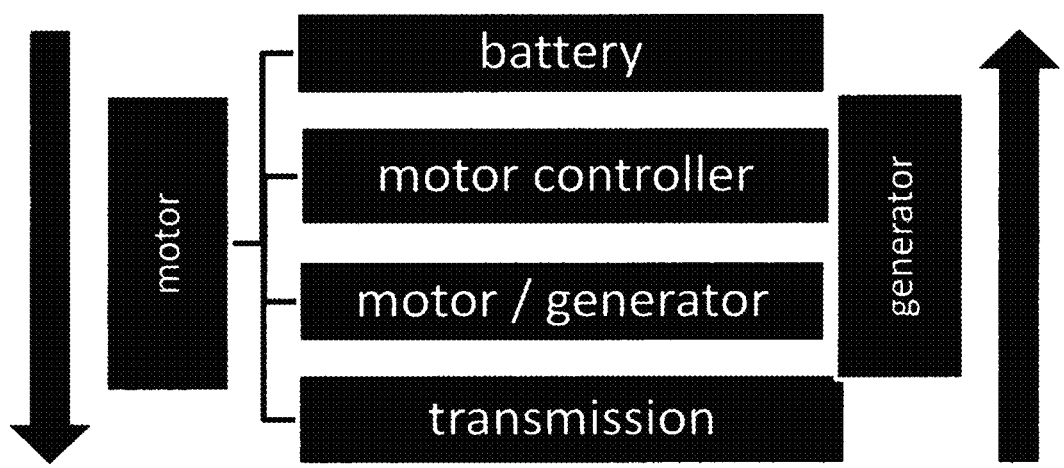
FIG. 7—motor/generator modes—motor mode and generator mode

Which ever system, for example, a series or parallel hybrid or an all electric vehicle, is chosen to use with this Angular Momentum Engine 2, when the vehicles is in the generator mode FIG. 7 the vehicle maintains a constant velocity, continuously charging the lithium-ion battery, while the Angular Momentum Engine 2 counteracts the drag of the generator mode and all other net force resistance. This should not be inappropriately compared with regenerative braking, even though both charge the lithium-ion battery, as both have different functionalities.

This patent application has illustrated how to change, from different frames of reference, a rotational centripetal force to a linear centripetal force to apply to a vehicles net force resistance to a change in velocity.

The invention claimed is:

1. An Angular Momentum Engine 2 that changes rotating centripetal force to linear centripetal force comprising:
   (a) A first planetary gearbox member having a first planet gear, a second planet gear, a third planet gear, a fourth planet gear, a first pinion gear, a second pinion gear, a third pinion gear, a fourth pinion gear, a first planet gear carrier, a first sun gear/shaft, a first upper planet gear carrier flange, and a first lower planet gear carrier flange, that are made of carbon steel;
   (b) A second planetary gearbox member having a fifth planet gear, a sixth planet gear, a seventh planet gear, an eighth planet gear, a fifth pinion gear, a sixth pinion gear, a seventh pinion gear, an eighth pinion gear, a second planet gear carrier, a second sun gear/shaft, a second upper planet gear carrier flange, and a second lower planet gear carrier flange that are made of carbon steel;
   (c) A held sun gear member that holds the said first sun gear/shaft and said second sun gear/shaft from turning;
   (d) A timing member having a drive sprocket, a driven sprocket, a first idler sprocket, a second idler sprocket, and a double duplex timing chain;
   (e) A tungsten weight member having a density 2.4 times greater than carbon steel;
   (f) A lightening hole member having no mass;
   (g) A motion control 'on/off' centripetal switch member;
   (h) A motion controlled (B) Motor member;
   (i) wherein net force resistance includes the net forces of inertia, gravity, aerodynamic and hydrodynamic drag, motor/generator drag, frictional forces, and backward forces that oppose a physical objects change in velocity, this net force determines if the motion control centripetal switch is 'on' a linear centripetal force or/'off' a tangential force;
   (j) A double helical member having two sets of teeth of opposite hands cut into one gear with axial forces eliminated on each set of teeth, and a smoother motion, a higher speed capability, and less noise, over single helical gears.

2. An Angular Momentum Engine 2 as claimed in claim 1, wherein:
   (a) said first planetary gearbox member, said first planet gear, said second planer gear, said third planet gear, said fourth planet gear, said first pinion gear, said second pinion gear, said third pinion gear, said fourth pinion gear, said first planet gear carrier, said first sun gear/shaft, said first upper planet carrier flange, said first lower planet carrier flange, each having a zero, ninety, one hundred eighty, two hundred seventy degree timing marks;
   (b) said first planetary gearbox member, said first planetary pinion gear and then said first planet gear extend radially outward from said first sun gear/shaft;
   (c) said first planetary gearbox member, said first sun gear/shaft said zero degree timing mark aligning with said first pinion gear said one hundred eight degree timing mark, and said first pinion gear said zero degree timing mark aligning with said first planet gear said one hundred eighty degree timing mark, and said first planet gear said zero degree timing mark aligning with said first planet gear carrier said zero degree timing mark;
   (d) said first planetary gearbox member, said second pinion gear and then said second planet gear extend radially outward from said first sun gear/shaft;

(e) said first planetary gearbox member, said first sun gear/shaft said ninety degree timing mark aligning with said second pinion gear said two hundred seventy degree timing mark, and said second pinion gear said ninety degree timing mark aligning with said second planet gear said two hundred seventy degree timing mark, and said second planet gear said ninety degree timing mark aligning with said first planet gear carrier said ninety degree timing mark;

(f) said first planetary gearbox member, said third pinion gear and then said third planet gear extend radially outward from said first sun gear/shaft;

(g) said first planetary gearbox member, said first sun gear/shaft said one hundred eighty degree timing mark aligning with said third pinion gear said zero degree timing mark, and said third pinion gear said one hundred eighty degree timing mark aligning with said third planet gear said zero degree timing mark, and said third planet gear said one hundred eighty degree timing mark aligning with said first planet gear carrier said one hundred eighty degree timing mark;

(h) said first planetary gearbox member, said fourth pinion gear and then said fourth planet gear extend radially outward from said first sun gear/shaft;

(i) said first planetary gearbox member, said first sun gear/shaft said two hundred seventy degree timing mark aligning with said fourth pinion gear said ninety degree timing mark, and said fourth pinion gear said two hundred seventy degree timing mark aligning with said fourth planet gear said ninety degree timing mark, and said fourth planet gear said two hundred seventy degree timing mark aligning with said first planet gear carrier said two seventy degree timing mark;

(j) said first pinion gear, said second pinion gear, said third pinion gear, said fourth pinion gear, have a positive two to one gear ratio to said first sun gear/shaft;

(k) said first pinion gear, said second pinion gear, said third pinion gear, said fourth pinion gear, have a positive two to negative one gear ratio to the planet gears, said first planet gear, said second planet gear, said third planet gear, said fourth planet gear;

(l) said first planet gear, said second planet gear, said third planet gear, said fourth planet gear, have said lightening hole member at said zero, ninety, one hundred eighty, two hundred seventy degree timing marks;

(m) said first planet gear, said second planet gear, said third planet gear, said fourth planet gear, each have said tungsten weight member press fit into said corresponding lightening hole at said zero degree timing mark.

3. An Angular Momentum Engine 2 as claimed in claim 1, wherein:

(a) said second planetary gearbox member, said fifth planet gear, said sixth planet gear, said seventh planet gear, said eighth planet gear, said fifth pinion gear, said sixth pinion gear, said seventh pinion gear, said eighth pinion gear, said second planet gear carrier, said second sun gear/shaft, said second upper planet carrier flange, said second lower planet carrier flange, each having a zero, ninety, one hundred eighty and two hundred seventy degree timing mark;

(b) said second planetary gearbox member, said fifth pinion gear and then said fifth planet gear extend radially outward from said second sun gear/shaft;

(c) said second planetary gearbox member, said second sun gear/shaft said zero degree timing mark aligning with said fifth pinion gear said one hundred eight degree timing mark, and said fifth pinion gear said zero degree timing mark aligning with said fifth planet gear said one hundred eighty degree timing mark, and said fifth planet gear said zero degree timing mark aligning with said second planet gear carrier said zero degree timing mark;

(d) said second planetary gearbox member, said sixth pinion gear and then said sixth planet gear extend radially outward from said second sun gear/shaft;

(e) said second planetary gearbox member, said second sun gear/shaft said ninety degree timing mark aligning with said sixth pinion gear said two hundred seventy degree timing mark, and said sixth pinion gear said ninety degree timing mark aligning with said sixth planet gear said two hundred seventy degree timing mark, and said sixth planet gear said ninety degree timing mark aligning with said second planet gear carrier said ninety degree timing mark;

(f) said second planetary gearbox member, said seventh pinion gear and then said seventh planet gear extend radially outward from said second sun gear/shaft;

(g) said second planetary gearbox member, said second sun gear/shaft said one hundred eighty degree timing mark aligning with said seventh pinion gear said zero degree timing mark, and said seventh pinion gear said one hundred eighty degree timing mark aligning with said seventh planet gear said zero degree timing mark, and said seventh planet gear said one hundred eighty degree timing mark aligning with said second planet gear carrier said one hundred eighty degree timing mark;

(h) said second planetary gearbox member, said eighth pinion gear and then said eighth planet gear extend radially outward from said second sun gear/shaft;

(i) said second planetary gearbox member, said second sun gear/shaft said two hundred seventy degree timing mark aligning with said eighth pinion gear said ninety degree timing mark, and said eighth pinion gear said two hundred seventy degree timing mark aligning with said eighth planet gear said ninety degree timing mark, and said eighth planet gear said two hundred seventy degree timing mark aligning with said second planet gear carrier said two hundred seventy degree timing mark;

(j) said fifth pinion gear, said sixth pinion gear, said seventh pinion gear, said eighth pinion gear, have a negative two to one gear ratio to said second sun gear/shaft;

(k) said fifth pinion gear, said sixth pinion gear, said seventh pinion gear, said eighth pinion gear, have a negative two to positive one gear ratio to the planet gears, said fifth planet gear, said sixth planet gear, said seventh planet gear, said eighth planet gear;

(l) said fifth planet gear, said sixth planet gear, said seventh planet gear, said eighth planet gear, each have said lightening hole member at said zero, ninety, one hundred eighty, and two hundred seventy degree timing marks;

(m) said fifth planet gear, said sixth planet gear, said seventh planet gear, said eighth planet gear, each have said tungsten weight member press fit into said lightening hole at said zero degree timing mark.

4. An Angular Momentum Engine 2 as claimed in claim 1, wherein:

said motion control 'on/off 'centripetal switch' member is:

(a) 'on' when the said centripetal forces are equal to or below the vehicles said net force resistance member;

(b) 'off' when the said centripetal forces are greater than the vehicles said net force resistance member.

5. An Angular Momentum Engine 2 as claimed in claim 1, wherein:
(a) said motion controlled (B) Motor member is splined to said timing member said drive sprocket;
(b) said timing member said driven sprocket, is splined to said second upper planet gear carrier flange;
(c) said motion controlled (B) Motor member turns said timing member said drive sprocket in said first planetary gearbox member clockwise and said timing member said driven sprocket in said second planetary gearbox member synchronously counter-clockwise as a result of said timing member's said first idler sprocket and said second idler sprocket.

6. An Angular Momentum Engine 2 as claimed in claim 1, wherein:
(a) said first sun gear/shaft and said second sun gear/shaft is held by said held sun gear member;
(b) said first planetary gearbox member, said second planetary gearbox member, are vertically oriented side by side respectively in the vehicle;
(c) said first planetary gearbox member, said second planetary gearbox member, rotate horizontally;
(d) said first planetary gearbox member, said second planetary gearbox member, said double helical member's said gears are double helical gears made of carbon steel;
(e) said first planetary gearbox member, said second planetary gearbox member, rotate synchronously said clockwise and said counter-clockwise respectively.

7. An Angular Momentum Engine 2 as claimed in claim 1, wherein:
(a) said first planetary gearbox member for every revolution said first planet gear carrier rotates clockwise around said held first sun gear/shaft, their four said pinion gears turn two revolutions clockwise on their axes, and their four said planet gears turn one revolution counter-clockwise on their axes;
(b) said second planetary gearbox member for every revolution said second planet gear carrier rotates counter-clockwise around said held second sun gear/shaft, their four said pinion gears, turn two revolutions counter-clockwise on their axes, and their four said planet gears turn one revolution clockwise on their axes;
(c) said first planetary gearbox member for every one degree said first planet gear carrier rotates clockwise around said held first sun gear/shaft, their four said pinion gears turn two degrees clockwise on their axes, and their four said planet gears turn one degree counter-clockwise on their axes;
(d) said second planetary gearbox member for every one degree said second planet gear carrier rotates counter-clockwise around said held second sun gear/shaft, their four said pinion gears turn two degrees counter-clockwise on their axes, and their four said planet gears turn one degree clockwise on their axes.

8. An Angular Momentum Engine 2 as claimed in claim 1, wherein:
(a) said first planetary gearbox member from a reference point inside said first planetary gearbox said four planet gears are turning counter-clockwise on their axes, however, from a reference point outside said first planetary gearbox, said four planet gears appear not to be turning on their axes as said first planet gear carrier synchronously turns clockwise;
(b) said second planetary gearbox member from a reference point inside said second planetary gearbox said four planet gears are turning clockwise on their axes, however, from a reference point outside said second planetary gearbox, said four planet gears appear not to be turning on their axes as said second planet gear carrier synchronously turns counter-clockwise;
(c) said first planetary gearbox member said four planet gears said reference point outside said first planetary gearbox, said appear not to be turning on their axes indicates said centripetal forces are linear;
(d) said second planetary gearbox member said four planet gears said reference point outside said second planetary gearbox, said appear not to be turning on their axes indicates said centripetal forces are linear.

9. An Angular Momentum Engine 2 as claimed in claim 1, wherein:
(a) said first planetary gearbox member said reference point inside said first planetary gearbox shows a circular counter-clockwise orbital path of each said planet gear's said tungsten weight member around their planet gear's axis, and an eccentric clockwise rotation of said planet gear's said tungsten weight member around said first sun gear/shaft;
(b) said second planetary gearbox member said reference point inside said second planetary gearbox shows a circular clockwise orbital path of each said planet gear's said tungsten weight member around their planet gear's axis, and an eccentric counter-clockwise rotation of said planet gear's said tungsten weight member around said second sun gear/shaft;
(c) for said first planetary gearbox member, said second planetary gearbox member, the circular orbital paths of each said planet gear's said tungsten weight member around their planet gear axis, and their eccentric orbital path around said sun gear/shaft results in two centripetal forces on each said planet gear's said tungsten weight member;
(d) for said first planetary gearbox member, said second planetary gearbox member, the centripetal forces as a result of said planet gear's tungsten weight member said circular orbital path around their planet gear's axis result in the same positive linear centripetal force being applied to said planet gear's said tungsten weight member;
(e) said first planetary gearbox member, said second planetary gearbox member, the centripetal forces as a result of said planet gear's tungsten weight member said eccentric orbital path results in a net positive linear centripetal force.

10. An Angular Momentum Engine 2 as claimed in claim 1, wherein:
(a) said first planetary gearbox member, said second planetary gearbox member, said net circular and eccentric orbit centripetal forces vary on each said tungsten weight member during a revolution however the net positive centripetal force remains the same;
(b) The centripetal force is applied to a vehicle's said net force resistance;
(c) The centripetal force when greater than a vehicle's said net force resistance becomes tangential and therefore will not accelerate the vehicle;
(d) The centripetal force, counteracting the vehicle's net force resistance, combined with a vehicle's propulsion system are used to accelerate the vehicle;

(e) The motion control 'on/off' centripetal switch member when 'off' the centripetal force is above the said net force resistance, and becomes tangential;

(f) The motion control 'on/off' centripetal switch member is optionally used to instantaneously turn 'on/off' the centripetal force when rapid de-acceleration is required rather than a full spin down of said B Motor;

(g) The linear centripetal forces are proportional to the square of the speed of the Angular Momentum Engine 2;

(h) The rotational and centripetal forces are balanced between said
first planetary gearbox member and said second planetary gearbox member.

11. An Angular Momentum Engine 2 as claimed in claim 1, wherein:

(a) said centripetal forces, counteracts the vehicle's said net force resistance;

(b) said net linear exponential centripetal forces of said eccentric, said circular, orbital path of said tungsten weight members requires a linear radial force called said net force resistance to hold said first sun gear/shaft and said second sun gear/shaft in place;

(c) said applied said linear radial force said 'net force resistance' is a force that opposes a vehicles change in velocity that includes inertia, gravity, aerodynamic drag, hydrodynamic drag, generator mode drag, frictional forces and backward forces, that oppose a change in velocity, these forces in some but not all instances, increase exponentially with the square of the vehicles speed.

12. A Angular Momentum Engine 2 as claimed in claim 1, wherein:

(a) the Angular Momentum Engine member requires the industries motion control motor, motion control system, to regulate the centripetal force applied to the vehicles said net force resistance in a real time environment;

(b) the Angular Momentum Engine 2 member real time environment in which it operates, will dictate the magnitude of the centripetal forces required under real time environmental conditions;

(c) the Angular Momentum Engine 2 member wherein: said linear centripetal force is proportional to the square of the speed;

(d) the Angular Momentum Engine 2 starting position is at the three hundred and fifteen degree timing mark on said carrier for said planetary gearbox (1) and the forty five degree timing mark on said carrier for said planetary gearbox (2);

(e) the Angular Momentum Engine 2 counteracts the drag of the motor/generator when the vehicle is in the generator mode and all other net force resistance allowing the vehicle to maintain a constant velocity.

* * * * *